(12) United States Patent
Jung

(10) Patent No.: US 11,110,604 B2
(45) Date of Patent: Sep. 7, 2021

(54) POSTURE CONTROL DEVICE FOR ROBOT AND ROBOT HAVING THE SAME

(71) Applicant: Seung Whan Jung, Seoul (KR)

(72) Inventor: Seung Whan Jung, Seoul (KR)

(*) Notice: Subject to any disclaimer, the term of this patent is extended or adjusted under 35 U.S.C. 154(b) by 0 days.

(21) Appl. No.: 16/847,408

(22) Filed: Apr. 13, 2020

(65) Prior Publication Data

US 2020/0238524 A1 Jul. 30, 2020

Related U.S. Application Data

(63) Continuation of application No. PCT/KR2018/011908, filed on Oct. 10, 2018.

(30) Foreign Application Priority Data

Oct. 25, 2017 (KR) .................. 10-2017-0139085
Jul. 9, 2018 (KR) .................. 10-2018-0079399

(51) Int. Cl.
*B25J 9/00* (2006.01)
*B25J 9/16* (2006.01)
(Continued)

(52) U.S. Cl.
CPC ........... *B25J 9/1679* (2013.01); *B25J 9/0009* (2013.01); *B25J 9/102* (2013.01); *B25J 9/1045* (2013.01);
(Continued)

(58) Field of Classification Search
CPC ........ B25J 9/0009; B25J 9/102; B25J 9/1045; B25J 19/0008; F03G 3/08; B63G 8/08; F05D 2260/15
(Continued)

(56) References Cited

U.S. PATENT DOCUMENTS 3,691,853 A * 9/1972 Curriston ............... G01C 19/02
  74/5.34
4,490,724 A * 12/1984 Bickman .............. F16M 11/123
  343/765
(Continued)

FOREIGN PATENT DOCUMENTS

JP 2011194937 A 10/2011
JP 2016049900 A 4/2016
(Continued)

OTHER PUBLICATIONS

International search report of PCT/KR2018/011908, dated Feb. 12, 2019, English translation.
(Continued)

*Primary Examiner* — William C Joyce
(74) *Attorney, Agent, or Firm* — STIP Law Group, LLC

(57) ABSTRACT

The present invention relates to: a posture control device for controlling the posture of a robot by means of a thruster; and a robot having the same. The posture control device, according to the present invention, comprises: a thruster for generating a propulsive force for supporting or hauling the load of a robot part; and a rotation mechanism installed between the robot part and the thruster so as to enable the robot part to rotate with respect to thruster or the thruster to rotate with respect to the robot part, wherein the rotation mechanism has at least two axes of rotation, wherein the axes of rotation respectively form a right angle. In addition, the robot, according to the present invention, comprises parts having the posture control device provided thereto, and may comprise: a first part and a second part having the posture control device provided thereto; and a bendable or extendable third part for connecting the first part and the second part.

16 Claims, 19 Drawing Sheets

(51) Int. Cl.
*B25J 9/10* (2006.01)
*B25J 19/00* (2006.01)

(52) U.S. Cl.
CPC ....... *B25J 19/0008* (2013.01); *F05D 2260/15* (2013.01)

(58) Field of Classification Search
USPC ................ 74/84 R, 84 S, 89.2, 89.21, 89.22; 60/232; 114/144 RE, 144 A; 180/7.3, 180/7.4; 239/261, 263.1, 264; 343/765, 343/766; 440/42
See application file for complete search history.

(56) References Cited

U.S. PATENT DOCUMENTS

| | | | | |
|---|---|---|---|---|
| 4,634,300 | A * | 1/1987 | Takebayashi | F16C 33/6692 384/548 |
| 5,875,685 | A * | 3/1999 | Storaasli | H01Q 3/08 74/490.1 |
| 10,479,465 | B2 * | 11/2019 | Moreno | B63G 8/04 |
| 10,737,780 | B2 * | 8/2020 | Ismagilov | B64C 27/28 |
| 10,947,951 | B2 * | 3/2021 | Vamvas | F03B 13/18 |
| 2010/0224723 | A1 * | 9/2010 | Apkarian | B64C 27/20 244/65 |
| 2017/0321664 | A1 * | 11/2017 | Robbins | F03G 3/08 |

FOREIGN PATENT DOCUMENTS

| | | |
|---|---|---|
| JP | 2016523759 A | 8/2016 |
| JP | 2018095077 A | 6/2018 |
| KR | 101151273 B1 | 6/2012 |
| KR | 101432046 B1 | 8/2014 |
| KR | 101740131 B1 | 5/2017 |

OTHER PUBLICATIONS

Office action from Korean Intellectual Property Office of 10-2018-0079399, dated Nov. 26, 2018, English translation.

* cited by examiner

POSTURE CONTROL DEVICE FOR ROBOT AND ROBOT HAVING THE SAME

CROSS-REFERENCE TO RELATED APPLICATIONS

This application is a continuation of Application No. PCT/KR2018/011908, filed Oct. 10, 2018 which in turn claims the benefit of Korean Patent Applications No. 10-2017-0139085, filed Oct. 25, 2017, and No. 10-2018-0079399, filed Jul. 9, 2018, the disclosures of which are incorporated by reference into the present application.

TECHNICAL FIELD

The present invention relates to a posture control device for a robot, and more particularly, to a posture control device for controlling the posture of a robot by using a thruster.

BACKGROUND ART

In general, a robot is a machine for automatically processing certain works or operating using its own abilities. Robots have been developed mainly for industrial uses and used for part of factory automation or have been used to perform work instead of a human being in an extreme environment that is unbearable for humans. However, owing to the development of robotics, robots have been utilized in various fields including home and medical uses.

In such a robot, it is essential to control the posture for various motions to be implemented, and one of the important factors to consider in controlling the posture is the weight of the robot. In general, when the weight of the robot increases, more solidity and stronger torque is required. In order to control this, the number of components used is increased and the performance of the corresponding components needs to be excellent, hardware capable of high-level computation is required, and there are many limitations in constructing and designing the appearance of the robot.

Due to these many requirements and constraints, a heavier robot takes a great deal of time to perform any posture or motion, and thus agility and mobility are slowed. In addition, there is a problem in that the cost is increased and the types of components that can be used are limited because advanced components and the like need to be used in manufacturing the robot.

(Patent Document 1) KR 10-1151273 B1 (Jun. 14, 2012)

DISCLOSURE

Technical Problem

The present invention is directed to providing a posture control device using a thruster for a robot, whereby posture for implementing various motions is easily guidable by supporting or towing a load of a robot part, and a robot having the posture control device.

Technical Solution

One aspect of the present invention provides a posture control device for a robot including a thruster configured to generate a propulsive force for supporting or hauling the load of a robot part, and a rotation mechanism installed between the robot part and the thruster so as to enable the robot part to rotate with respect to the thruster, or the thruster to rotate with respect to the robot part, wherein the rotation mechanism has at least two axes of rotation, and the at least two axes of rotation respectively form a right angle.

Another aspect of the present invention provides a robot, the robot including parts having the posture control device provided thereto.

Advantageous Effects

In a posture control device for a robot and a robot having the same according to the present invention, since a load of a robot part is supported by thrust of a thruster so that limitations caused by the weight may be reduced, wide selection of components that constitute the robot is possible, the number of the components can be reduced, relatively inexpensive components can be used, and thus the cost of manufacturing the robot can be reduced and variety can be secured in constructing and designing the appearance of the robot.

In addition, the thrust is generated even in a usage environment in which a bearing power is weak and movement is not easy, such as in sand, and thus the load of the robot is hauled by generation of thrust so that movement of the robot is easily possible.

Furthermore, stable posture control of the robot parts can be easily guided using thrust of the thruster so that agility and mobility of the robot is increased, and a wider radius of action is possible, and the robot capable of performing various motions can be manufactured.

Figure 1:
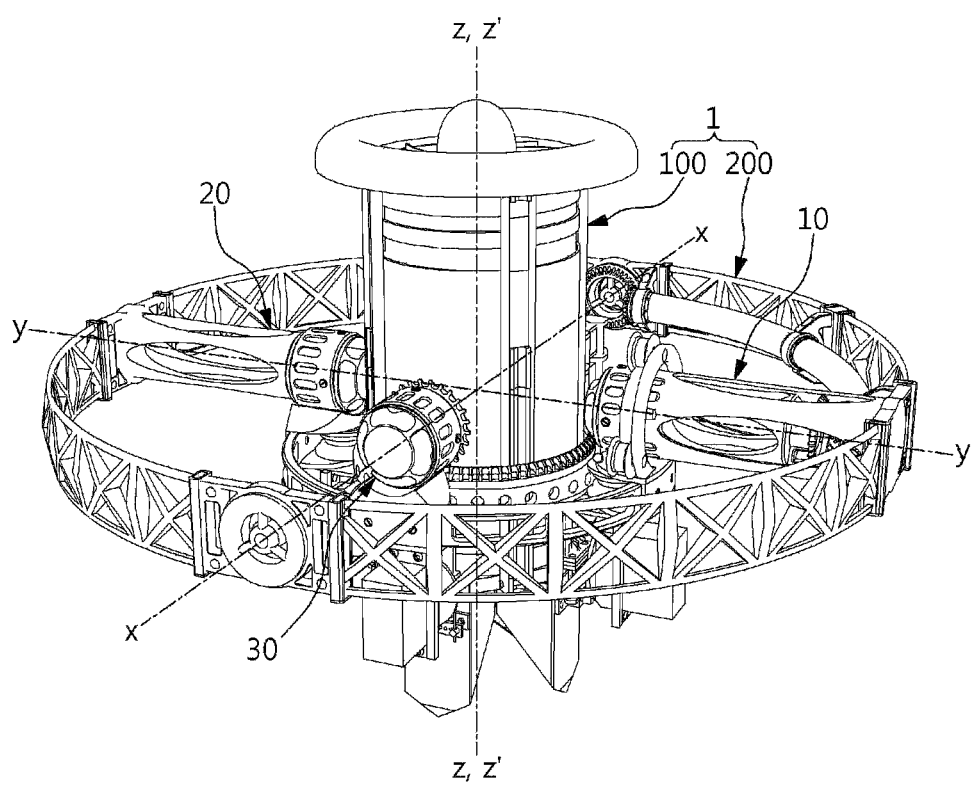
FIG. 1 is a perspective view illustrating a posture control device for a robot according to the present invention.

| * Descriptions of main reference numerals in the drawings * | |
|---|---|
| 1: posture control device | 2: robot part |
| 2': body | 2": arm, leg |
| 2-1: first part | 2-2: second part |
| 2-3: third part | 10: first rotation driving unit |
| 11: motor | 12: driving unit body |
| 12', 12": fixing casing | 13: power transmission mechanism |
| 14: motor rotating shaft | 15: first pinion gear |
| 15': first pulley | 16: gear |
| 16': belt | 17: rotating shaft |
| 17': tension pulley | 18: roller |

* Descriptions of main reference numerals in the drawings *

| | |
|---|---|
| 19: rolling rotation unit | 20: second rotation driving unit |
| 21: motor | 22: motor rotating shaft |
| 23: driving unit body | 24: fixing casing |
| 30: third rotation driving unit | 31: motor |
| 32: pinion gear | 33: ring gear |
| 34: fixing casing | 35: connection body |
| 40: thruster coupling unit | 41: fixing part |
| 42: rotation part | 43: rail |
| 44: roller | 50: frame |
| 51: rotating shaft part | 52: rotation bearing part |
| 53: second pinion gear | 53': second pulley |
| 54: support bearing part | 61: outer shell |
| 62: frame structure | 100: thruster |
| 200: rotation mechanism | x: first axis of rotation |
| y: second axis of rotation | z: third axis of rotation |
| z': axis of thruster | |

BEST MODE OF THE INVENTION

Hereinafter, a posture control device for a robot according to the present invention and a robot having the same will be described in detail with reference to the attached drawings. However, a detailed description of well-known functions and configurations that may unnecessarily obscure the point of the present invention will be omitted.

FIG. 1 is a perspective view illustrating a posture control device for a robot according to the present invention.

Referring to FIG. 1, a posture control device 1 according to the present invention includes a thruster 100 that generates thrust for supporting or hauling a load of a robot part 2, and a rotation mechanism 200 that is installed between the robot part 2 and the thruster 100 and rotates the robot part 2 with respect to the thruster 100 or rotates the thruster 100 with respect to the robot part 2.

The thruster 100 may be a device capable of hovering flight by itself due to generated propulsive force, and a variety of types of thrusters may be used. For example, the thruster 100 having a shape of a single copter capable of hovering flight by itself may be used, as shown in FIG. 1, and in addition, a thruster having a shape of a multi-copter, such as a quadcopter, a helicopter, or a rocket, may also be used. However, because the weight and volume of the robot part 2 increase in proportion to the weight and volume of the thruster 100, preferably, the thruster 100 may be lightweight and have a small size if possible, and it is also preferable to minimize the number of thrusters 100.

The rotation mechanism 200 includes rotation driving units 10, 20, 30 that rotate the robot part 2 or the thruster 100 about at least two axes of rotation (x, y, z) that form a right angle with respect to one another.

By using the thruster 100 and rotation mechanism 200, the posture control device 1 according to the present invention may rotate the robot part 2 using the rotation mechanism 200 by supporting a load of the robot part 2 so as to change inclination or position of the robot part 2 or may rotate the thruster 100 using the rotation mechanism 200 so as to change a direction of propulsive force, haul the load of the robot part 2, and change the position of the robot part 2.

Figure 2:
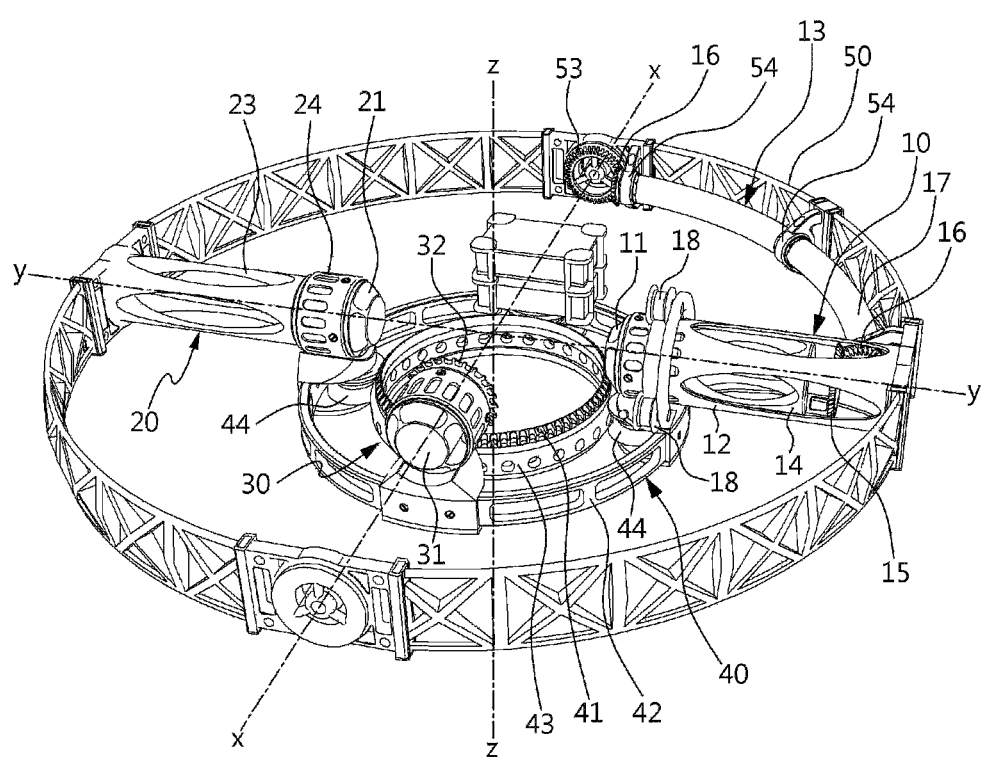
FIG. 2 is a perspective view illustrating a rotation mechanism of the posture control device according to a first embodiment of the present invention.

FIG. 2 is a perspective view illustrating a rotation mechanism of the posture control device according to a first embodiment of the present invention, FIGS. 3 to 8 are partial views of FIG. 2, and FIGS. 9 to 11 are views illustrating a modified example of the first embodiment.

Referring to FIGS. 1 and 2, the rotation mechanism 200 according to the first embodiment of the present invention includes a rotation driving unit including a first rotation driving unit 10 having a first axis x of rotation that forms a right angle with respect to an axis z' of the thruster 100, a second rotation driving unit 20 having a second axis y of rotation that forms a right angle with respect to the axis z' of the thruster 100 and the first axis x of rotation, respectively, and a third rotation driving unit 30 having a third axis z of rotation that is parallel to the axis z' of the thruster 100. Preferably, the third axis z of rotation may be formed to be the same axis as the axis z' of the thruster 100.

The rotation mechanism 200 includes a thruster coupling unit 40 coupled to the thruster 100 and a frame 50 coupled to the robot part 2 to be rotatable about the first axis x of rotation, and the thruster coupling unit 40 and the frame 50 may be coupled to each other to be rotatable about the second axis y of rotation by the second rotation driving unit 20.

The thruster coupling unit 40 is a component for coupling the thruster 100 to the rotation mechanism 200, and the shape of the thruster coupling unit 40 is not limited, and for example, the thruster coupling unit 40 may be integrally formed as a part of the thruster 100 or the rotation driving unit.

Figure 3:
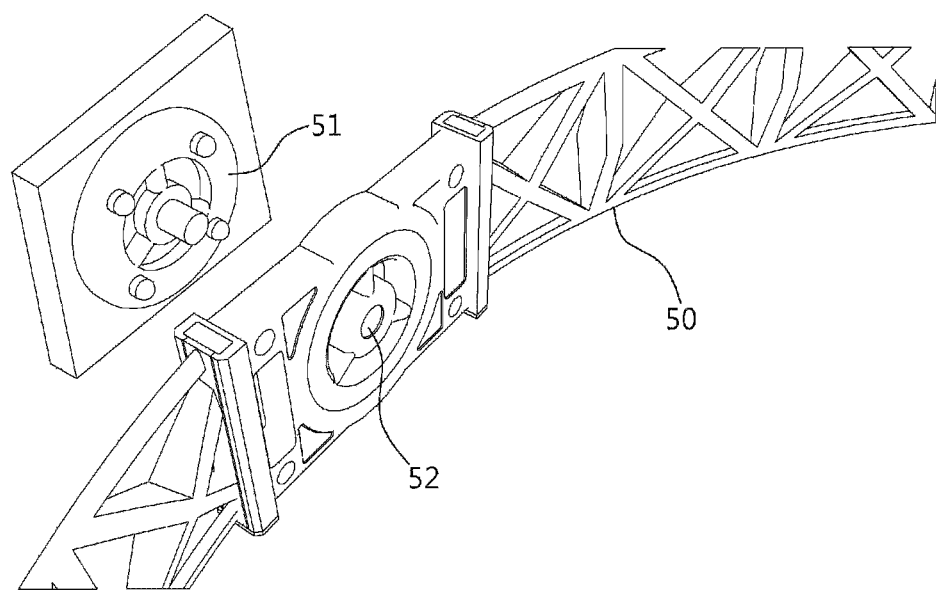
FIG. 3, FIG. 4, FIG. 5, FIG. 6, FIG. 7 and FIG. 8 are partial views of FIG. 2.

Referring to FIG. 3, in order to couple the frame 50 to the robot part 2 to be rotatable about the first axis x of rotation according to an embodiment, a rotating shaft part 51 may be provided in the robot part 2, and a rotation bearing part 52 to be coupled to the rotating shaft part 51 may be provided in the frame 50.

Figure 4:
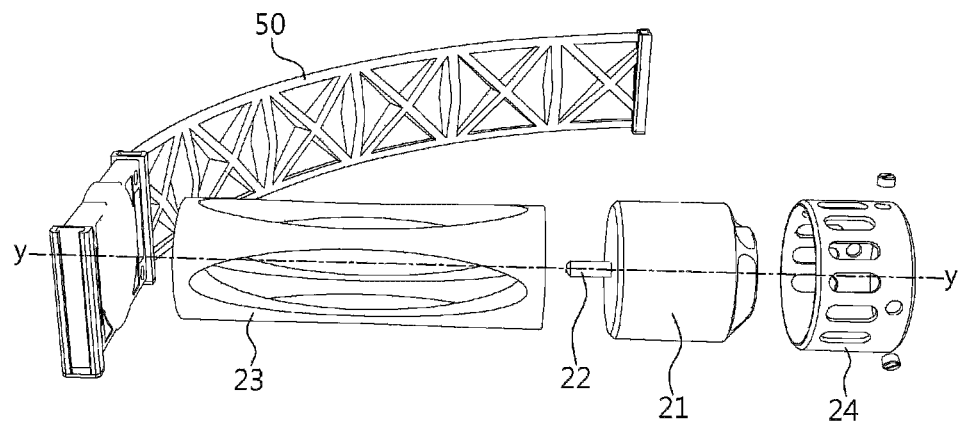

Referring to FIGS. 2 and 4, the second rotation driving unit 20 includes a motor 21 that is fixedly installed on the thruster coupling unit 40 and generates a rotational force, and a driving unit body 23 having one end fixed and coupled to the frame 50 and the other end coupled to a rotating shaft 22 of the motor 21 so that the frame 50 may be rotated with respect to the thruster coupling unit 40 or the thruster coupling unit 40 may be rotated with respect to the frame 50 about the second axis y of rotation by the rotational force of the motor 21.

The driving unit body 23 is a member for connecting the rotating shaft 22 of the motor 21 to the frame 50 so as to transmit the rotational force of the motor 21 to the frame 50, and FIGS. 2 and 4 illustrate an example of the optimum shape of the driving unit body 23 for minimizing weight together with robust power transmission. However, the shape of the driving unit body 23 is not necessarily limited thereto. Also, the driving unit body 23 may also be formed to have a shape in which the rotating shaft 22 of the motor 21 extends, and in this case, the driving unit body 23 refers to an extended part of the rotating shaft 22.

Preferably, the driving unit body 23 may have a certain length so as to secure a rotation space of the thruster 100 between the thruster coupling unit 40 and the frame 50. However, when the frame 50 may be directly connected to the rotating shaft 22 of the motor 21, the driving unit body 23 may be omitted or may also be formed to be integrated with the frame 50 as the shape of a protrusion or extension part.

Meanwhile, in FIGS. 2 and 4, reference numeral 24 represents a fixing casing for fixing and coupling the motor 21 to the thruster coupling unit 40, and the fixing casing 24 may be omitted when the motor 21 is directly fixed to the thruster coupling unit 40.

Figure 5:
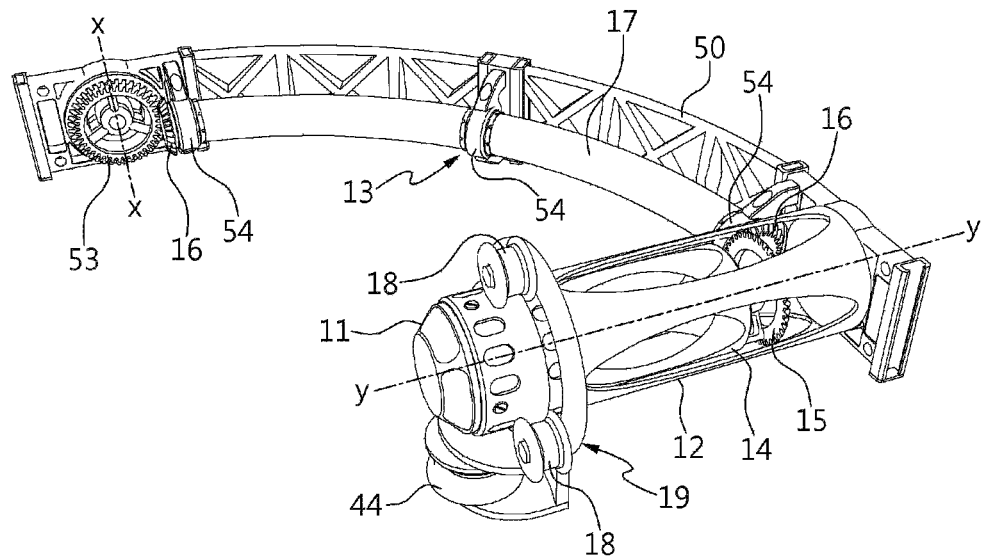
Figure 6:
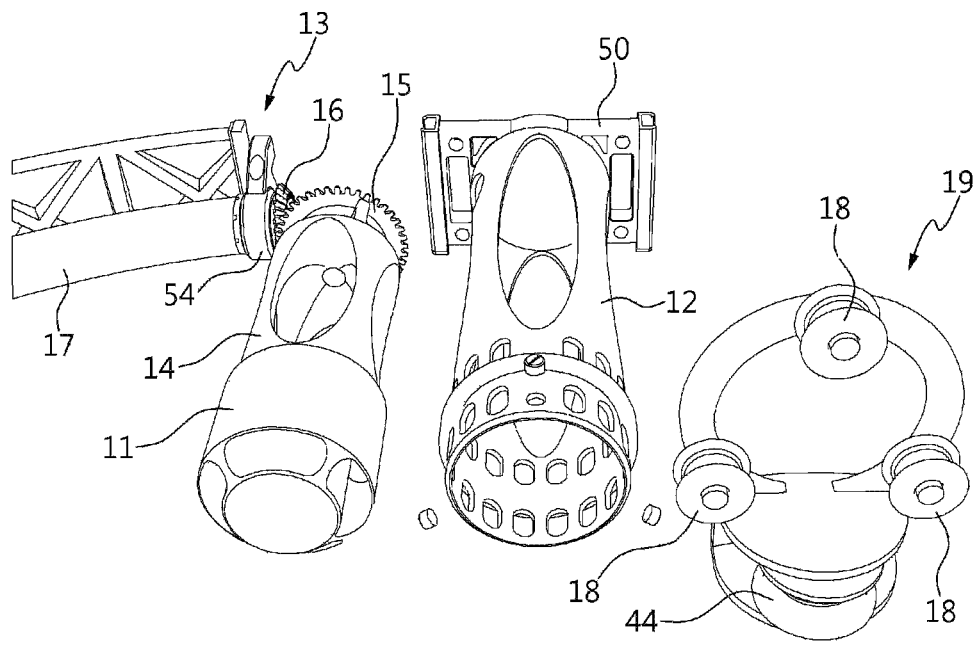

Referring to FIGS. 2, 5, and 6, the first rotation driving unit 10 may be installed on the thruster coupling unit 40 to be rotatable about the second axis y of rotation and includes a motor 11 for generating a rotational force, a driving unit body 12 having one end fixed and coupled to the frame 50 and the other end fixed and coupled to the motor 11 so that, when the frame 50 or the thruster coupling unit 40 is rotated about the second axis y of rotation, the driving unit body 12 is rotated on the thruster coupling unit 40 together with the motor 11, and a power transmission mechanism 13 that transmits the rotational force of the motor 11 to rotation elements 53 and 53' fixedly installed on the first axis x of rotation of the robot part 2 so that the robot part 2 may be rotated with respect to the frame 50 or the frame 50 may be rotated with respect to the robot part 2 about the first axis x of rotation.

According to the embodiment shown in FIGS. 2, 5, and 6, the rotation elements may be a second pinion gear 53 fixed and coupled to the robot part 2, and referring to FIG. 3, the second pinion gear 53 may be fixed and coupled to the rotating shaft part 51 of the robot part 2.

Also, the power transmission mechanism 13 may include a first pinion gear 15 coupled to the rotating shaft 14 of the motor 11 and a rotating shaft 17 having gears 16 at both ends of the rotating shaft 17 to be engaged with the first pinion gear 15 and the second pinion gear 53 and transmitting rotation power of the first pinion gear 15 to the second pinion gear 53.

Figure 7:
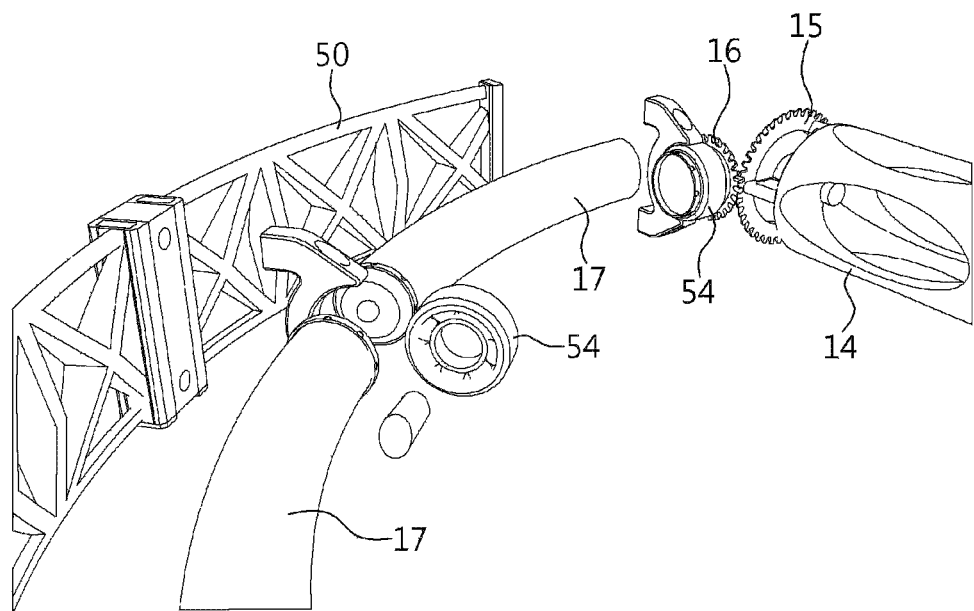

The rotating shaft 17 may have continuous coupling of universal joints and may have a bent shape while following the shape of the frame 50, and referring to FIG. 7, support bearing parts 54 for supporting the rotating shaft 17 may be formed on the frame 50 at an appropriate distance.

Meanwhile, in order to rotate the driving unit body 12 with respect to the thruster coupling unit 40 about the second axis y of rotation, a rolling rotation unit 19 is provided on the thruster coupling unit 40 and includes rolling rollers 18 arranged along the circumferential surface of the driving unit body 12.

Thus, when the frame 50 is rotated with respect to the thruster coupling unit 40 or the thruster coupling unit 40 is rotated with respect to the frame 50 about the second axis y of rotation by the second rotation driving unit 20, the driving unit body 12 is rotated with respect to the thruster coupling unit 40 about the second axis y of rotation together with the motor 11 so that the frame 50 and the thruster coupling unit 40 or the robot part 2 are not rotated about the first axis x of rotation.

Figure 8:
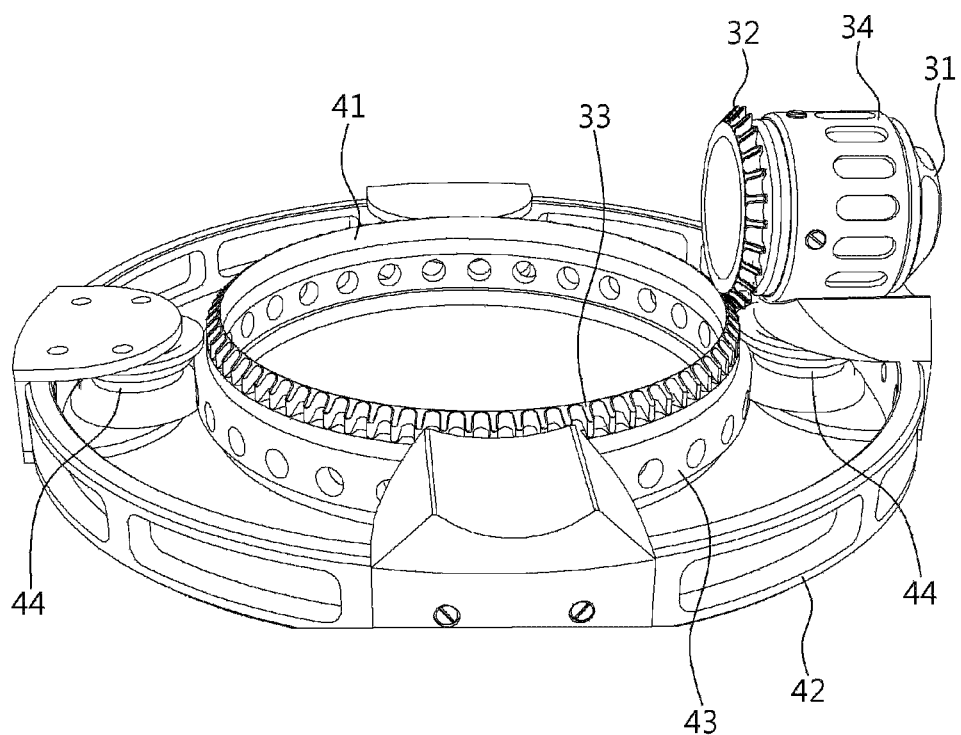

Referring to FIGS. 2 and 8, the thruster coupling unit 40 includes a fixing part 41 fixed and coupled to the thruster 100 and a rotation part 42 located outside the fixing part 41 and coupled to the fixing part 41 to be rotatable about the third axis z of rotation.

To this end, a rail 43 is formed on an outer surface of the fixing part 41, and a roller 44 that is moved by rolling along the rail 43 of the fixing part 41 is provided on an inner surface of the rotation part 42.

Meanwhile, on the contrary, the rail 43 may be formed on the inner surface of the rotation part 42, and the roller 44 that is moved by rolling along the rail 43 of the rotation part 42 may be provided on the outer surface of the fixing part 41, and other sliding units having an equivalent function, e.g. a bearing, may also be used instead of the rail 43 and the roller 44.

The third rotation driving unit 30 includes a motor 31 fixedly installed at the rotation part 42 and generating a rotational force, a pinion gear 32 fixedly installed at a rotating shaft of the motor 31, and a ring gear 33 located on the fixing part 41 and engaged with the pinion gear 32 so that the rotation part 42 may be rotated with respect to the fixing part 41 or the fixing part 41 may be rotated with respect to the rotation part 42 about the third axis z of rotation by the rotational force of the motor 31.

In the present specification, the term "pinion gear" is used only for convenience of reference for relative classification between gears and is not used for limitation in the relative sizes of the gears.

Meanwhile, in FIGS. 2 and 8, reference numeral 34 represents a fixing casing for fixing and coupling the motor 31 to the thruster coupling unit 40.

Figure 9:
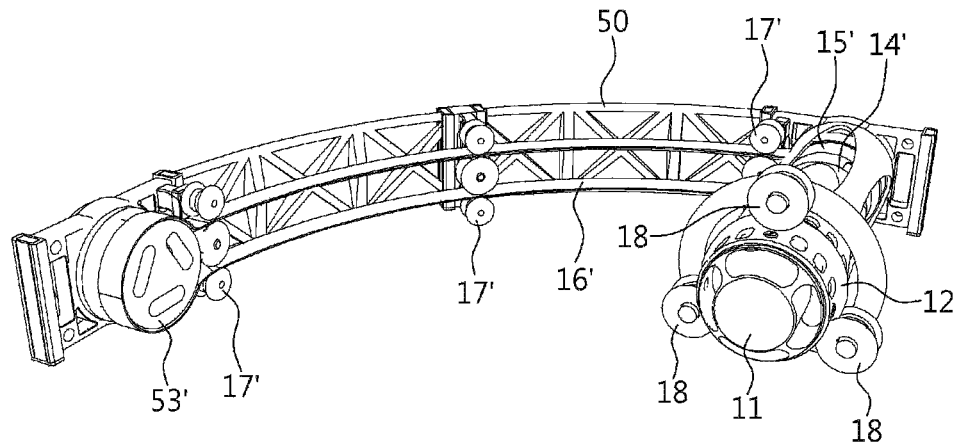
FIG. 9, FIG. 10 and FIG. 11 illustrate a modified example of the first embodiment.

According to a modified embodiment shown in FIG. 9, the rotation element may be a second pulley 53' fixed and coupled to the robot part 2, and referring to FIG. 3, the second pulley 53' may be fixed and coupled to the rotating shaft part 51 of the robot part 2.

Thus, the power transmission mechanism 13 includes a first pulley 15' coupled to the rotating shaft 14 of the motor 11 and a belt 16' for transmitting rotation power of the first pulley 15' to the second pulley 53', and the belt 16' may have a curved shape while following the shape of the frame 50 using tension pulleys 17' installed along the frame 50.

Meanwhile, even the third rotation driving unit 30 may also be configured so that a rotational force is transmitted from the rotating shaft of the motor 31 to the fixing part 41 using a belt and a pulley, instead of the pinion gear 32 and the ring gear 33.

Figure 10:
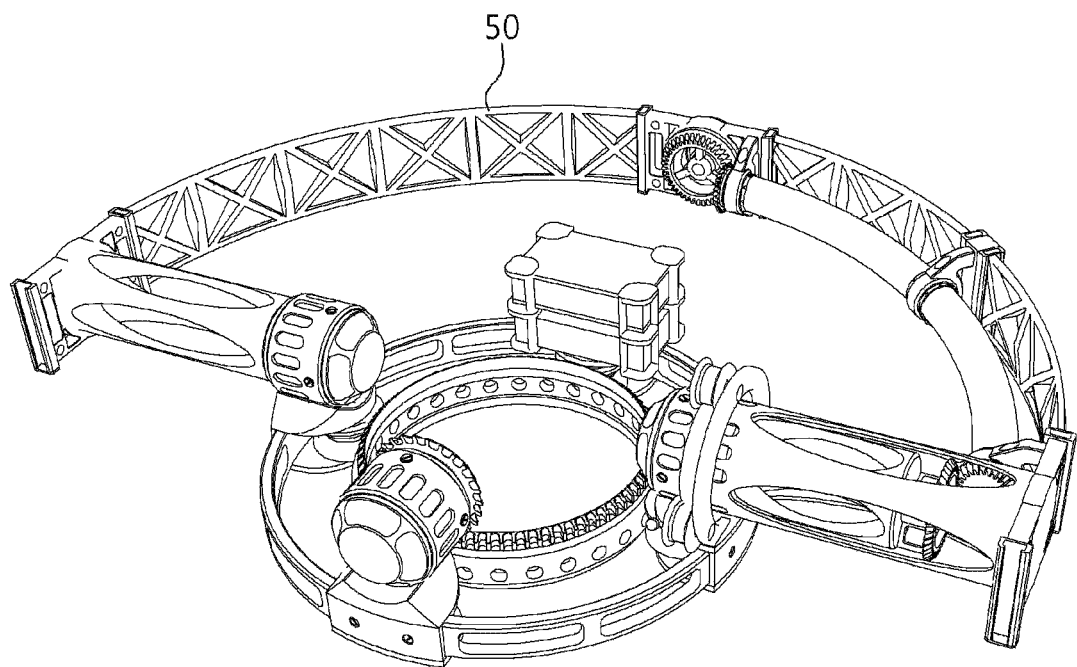
Figure 11:
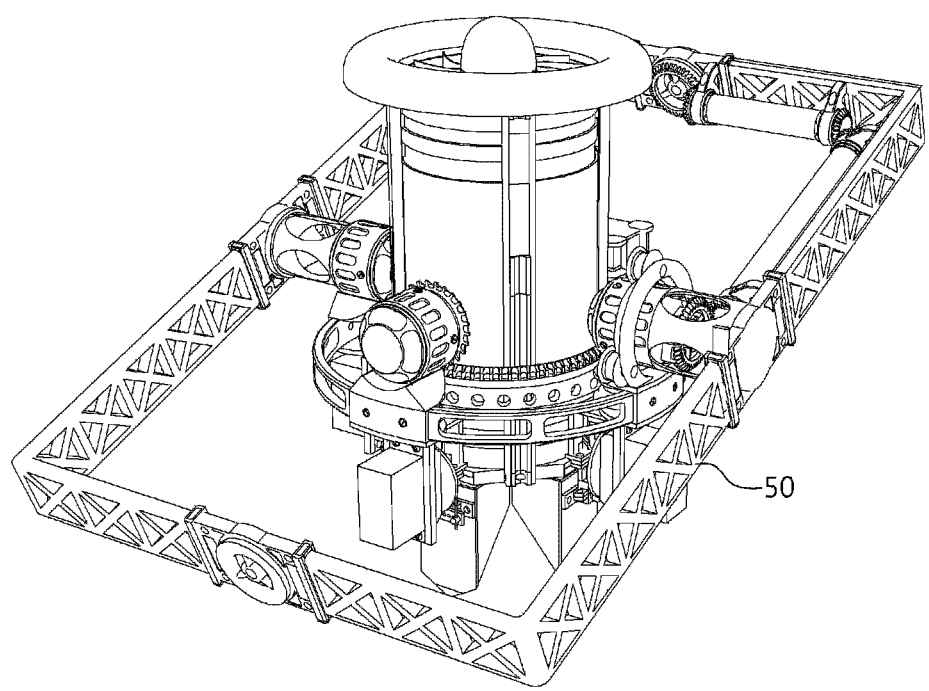

Also, according to a modified embodiment shown in FIGS. 10 and 11, half of the frame 50 may be formed so as to have a semicircular shape, or the frame 50 may have a rectangular shape. In addition, the frame 50 may be formed in one of various arbitrary forms by reflecting the shape of the robot part 2 or the thruster 100, and in this case, the power transmission mechanism 13 may have one of various shapes using a soft hollow shaft or an elbow mechanism according to the shape of the frame 50 and the arrangement structure with the thruster coupling unit 40.

Figure 12:
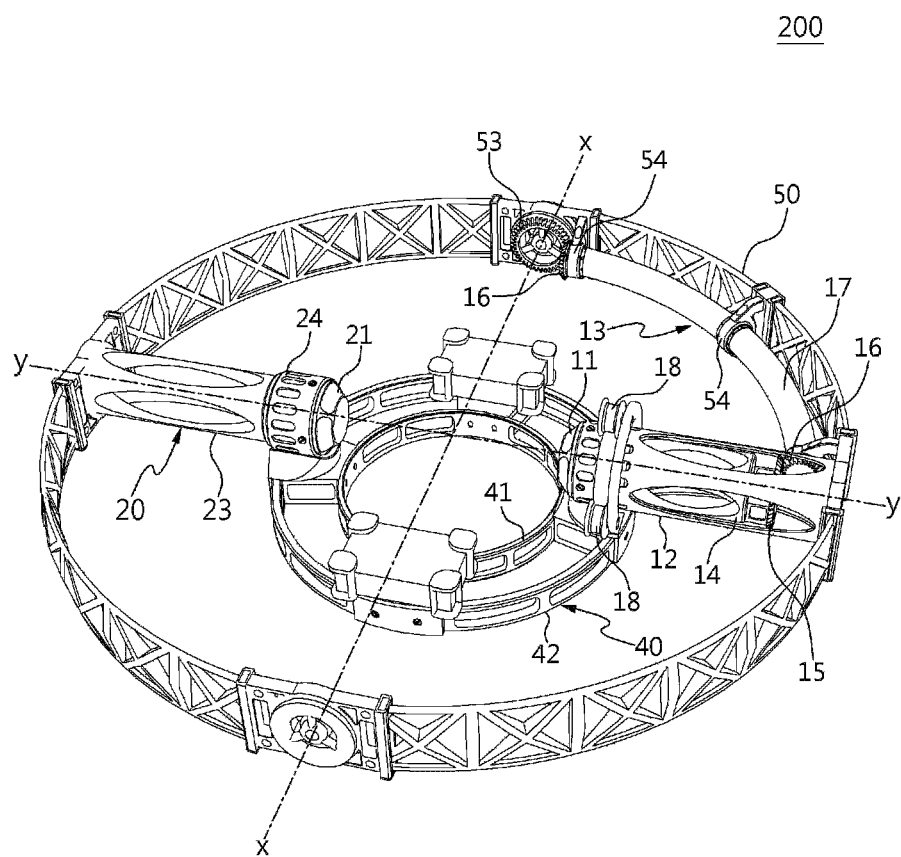
FIG. 12 is a perspective view illustrating a rotation mechanism of the posture control device according to a second embodiment of the present invention.

FIG. 12 is a perspective view illustrating a rotation mechanism of the posture control device according to a second embodiment of the present invention.

Referring to FIG. 12, the posture control device 1 according to the second embodiment of the present invention does not include the third rotation driving unit 30, unlike in the first embodiment described above. Thus, in the thruster coupling unit 40, the fixing part 41 and the rotation part 42 are fixed and coupled to each other so as not to rotate with respect to each other. In this case, the thruster coupling unit 40 does not need to be formed to be divided into the fixing part 41 and the rotation part 42.

In general, the thruster 100 has its own rotation flight function, and in the second embodiment, the frame 50 may be rotated about the third axis z of rotation using the rotation flight function of the thruster 100. Thus, the third rotation driving unit 30 is omitted. Also, according to an application example, since there is a case where rotation about the third axis z of rotation is not required, the second embodiment is particularly appropriate for such cases.

In the second embodiment, the third rotation driving unit 30 may be omitted as compared to the first embodiment. Thus, the weight and size of the rotation mechanism 200 may be reduced and thus, required propulsive force of the thruster 100 may be reduced.

Meanwhile, the modified example shown in FIGS. 9 to 11 described above may be applied to the second embodiment, like in the first embodiment.

Figure 13:
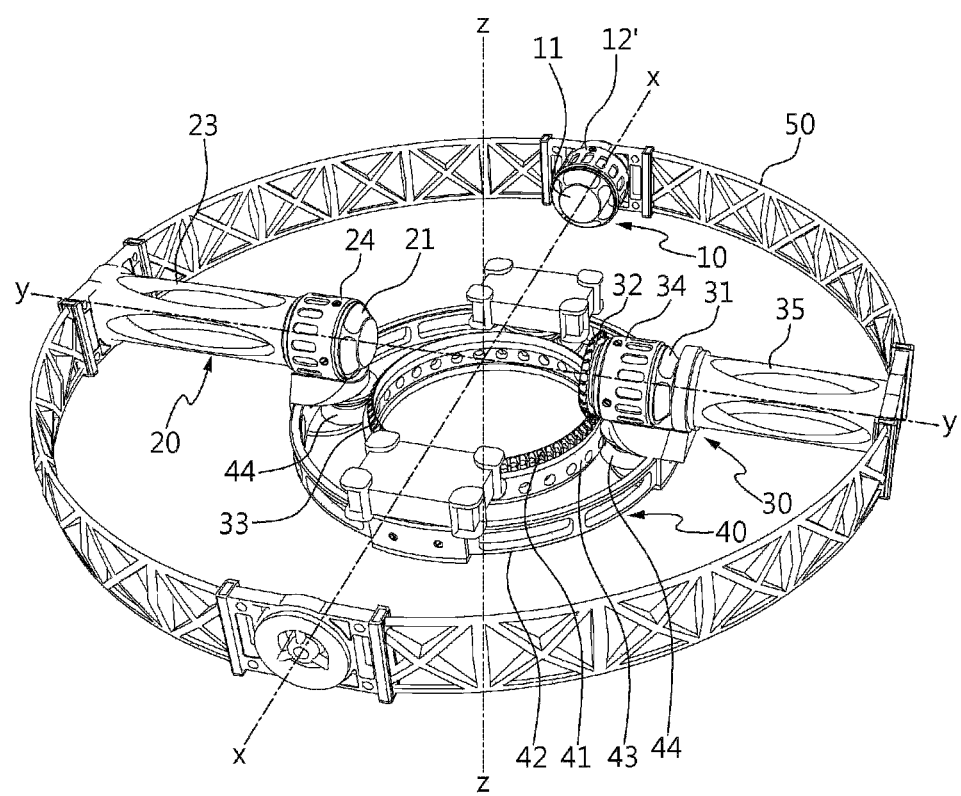
FIG. 13 is a perspective view illustrating a rotation mechanism of the posture control device according to a third embodiment of the present invention.

FIG. 13 is a perspective view illustrating a rotation mechanism of the posture control device according to a third embodiment of the present invention.

Referring to FIG. 13, in the posture control device 1 according to the third embodiment of the present invention, unlike in the first embodiment described above, the first rotation driving unit 10 comprises a motor 11 for generating a rotational force configured in such a way that a main body of the motor 11 is fixedly installed on the frame 50 and a rotating shaft of the motor 11 is fixedly installed on the robot part 2, so that the first rotation driving unit 10 rotates the robot part 2 with respect to the frame 50 or the frame 50 with respect to the robot part 2 about the first axis x of rotation by the rotational force of the motor 11.

In this case, the main body of the motor 11 may be fixed and coupled to a fixing casing 12' fixedly formed at the frame 50, and the rotating shaft of the motor 11 may be fixed and coupled to the rotating shaft part 51 of the robot part 2.

Meanwhile, contrary to this, the main body of the motor 11 may also be fixedly installed on the robot part 2, and the rotating shaft of the motor 11 may also be fixedly formed on the frame 50.

Also, in the posture control device 1 according to the third embodiment of the present invention, the third rotation driving unit 30 is provided at a location which faces the second rotation driving unit 20 with respect to the thruster coupling unit 40 unlike in the first embodiment described above.

In this case, the motor 31 is fixedly installed on the rotation part 42 using the fixing casing 34, and the rotation part 42 is connected to the frame 50 using a connection body 35 having one end fixed and coupled to the frame 50 and the other end coupled to the rotation part 42 to be rotatable about the second axis y of rotation so that, when the rotation mechanism 200 operates, the third rotation driving unit 30 may be stably weight-balanced together with the second rotation driving unit 20.

Preferably, for stable hovering flight of the thruster 100, the center of gravity of the rotation mechanism 200 may be constantly maintained when the rotation mechanism 200 operates, and in the third embodiment, the first rotation driving unit 10 and the third rotation driving unit 30 have the above-described shapes so that, when the posture of the robot is controlled, a center of gravity of the rotation mechanism 200 may be maintained more constantly.

In the third embodiment, the power transmission mechanism 13 may be omitted as compared to the first embodiment. Thus, the weight and size of the rotation mechanism 200 may be reduced, and a time difference and an energy loss that may occur during power transmission may be minimized.

Meanwhile, the modified example shown in FIGS. 10 and 11 described above may be applied to the third embodiment, like in the first embodiment.

Figure 14A:
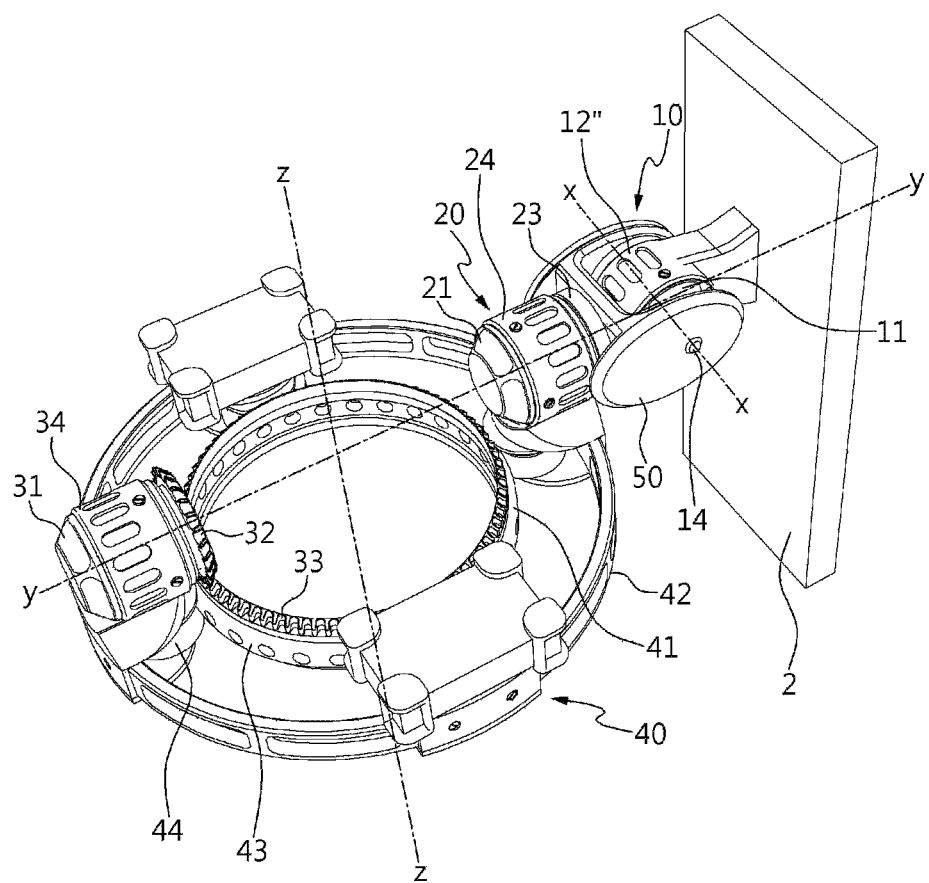
FIG. 14a, FIG. 14b and FIG. 14c are perspective views illustrating a rotation mechanism of the posture control device according to a fourth embodiment of the present invention.
Figure 14B:
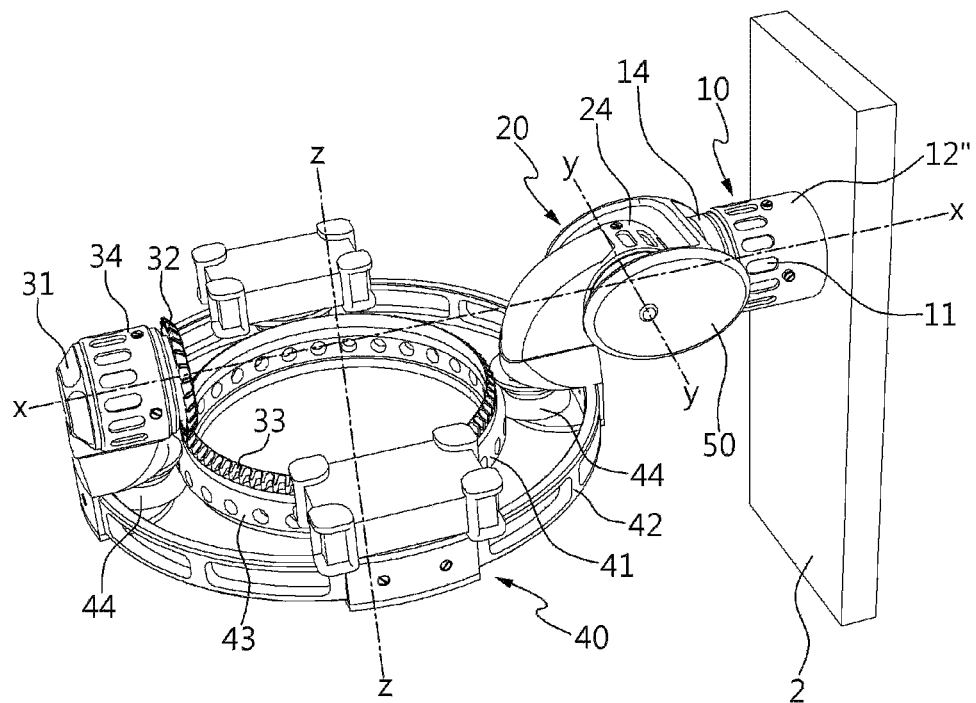
Figure 14C:
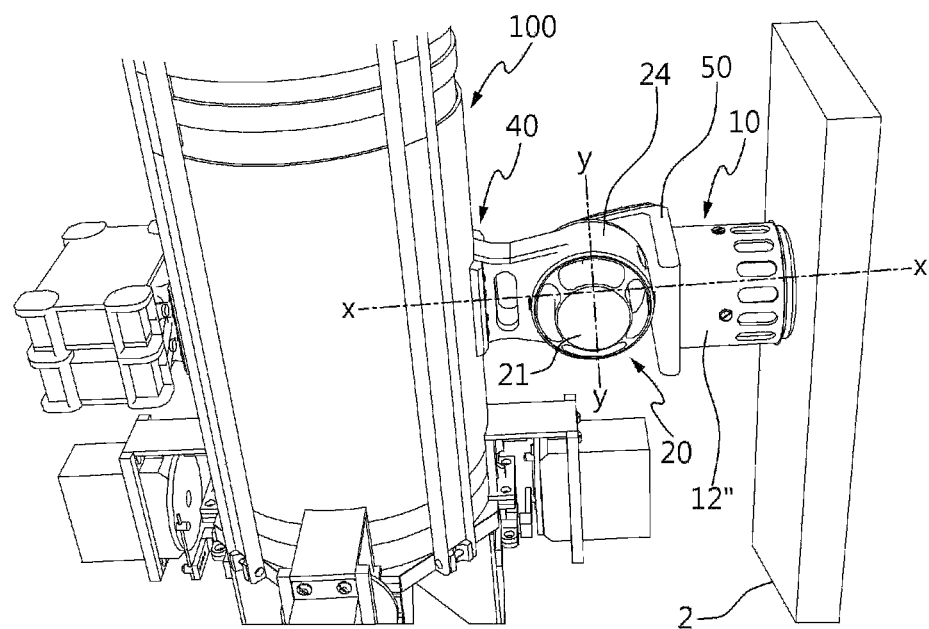

FIGS. 14A to 14C are perspective views illustrating a rotation mechanism of the posture control device according to a fourth embodiment of the present invention.

Referring to FIGS. 14A to 14C, in the posture control device 1 according to the fourth embodiment of the present invention, unlike in the first embodiment described above, the first rotation driving unit 10 includes a motor 11, for generating a rotational force, of which the main body is fixedly installed on the robot part 2 and the rotating shaft 14 is fixedly installed on the frame 50, so that the first rotation driving unit 10 makes the robot part 2 rotate with respect to the frame 50 or makes the frame 50 rotate with respect to the robot part 2 about the first axis x of rotation by the rotational force of the motor 11.

In this case, the main body of the motor 11 may be fixed and coupled to a fixing casing 12" formed integrally with or coupled to the robot part 2.

Meanwhile, in contrast, the main body of the motor 11 may also be fixedly installed on the frame 50, and the rotating shaft of the motor 11 may also be fixedly formed on the robot part 2.

The embodiment shown in FIG. 14C does not include the third rotation driving unit 30 like the second embodiment described above. Thus, the thruster coupling unit 40 is integrally formed as a part of the thruster 100 or the second rotation driving unit 20.

According to the fourth embodiment, as shown in FIGS. 14A to 14C, the structure of the frame 50 and the first and second rotation driving units 10, 20 may be more simplified, and the sizes thereof may be reduced as compared to the first to third embodiments.

FIGS. 15 to 19 are views illustrating a robot including the posture control device according to the present invention.

Figure 15A:
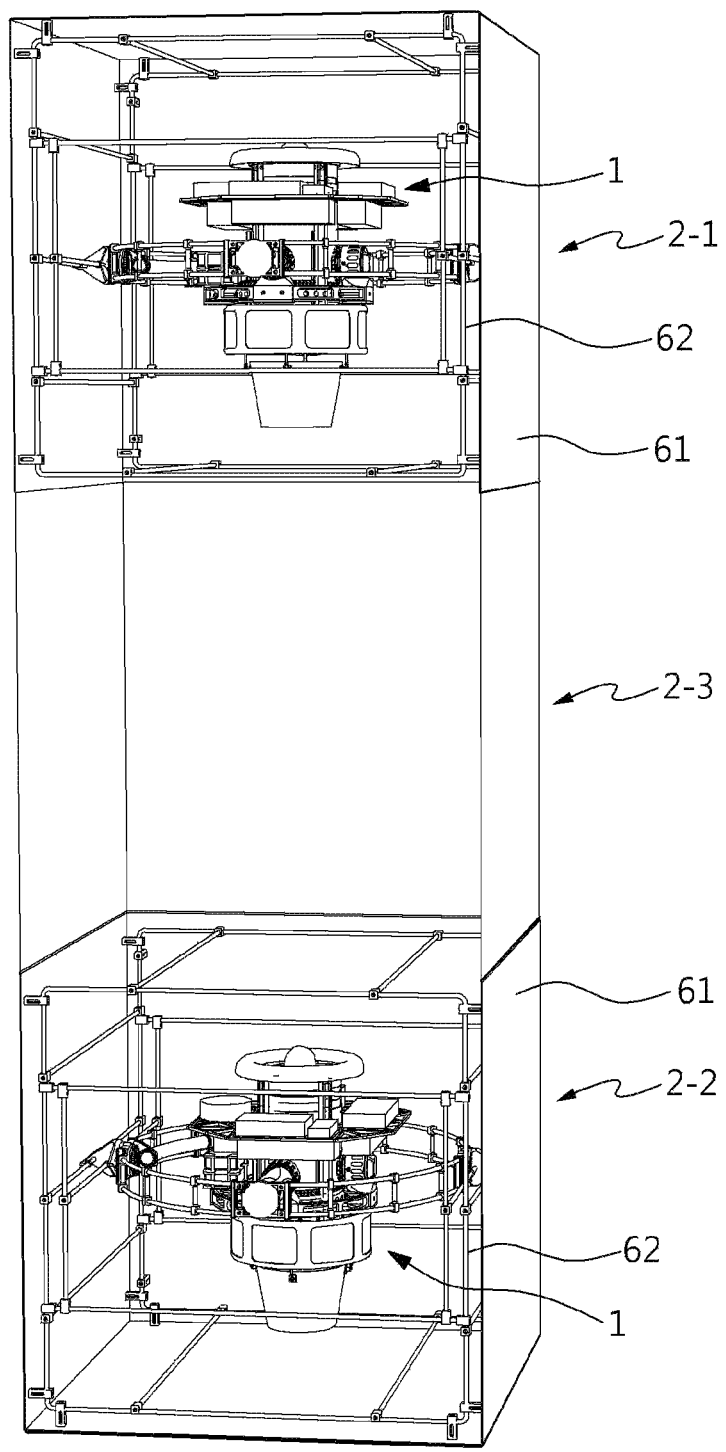
FIG. 15a, FIG. 15b, FIG. 15c, FIG. 16a, FIG. 16b, FIG. 17, FIG. 18 and FIG. 19 are views illustrating a robot including the posture control device according to the present invention.
Figure 15B:
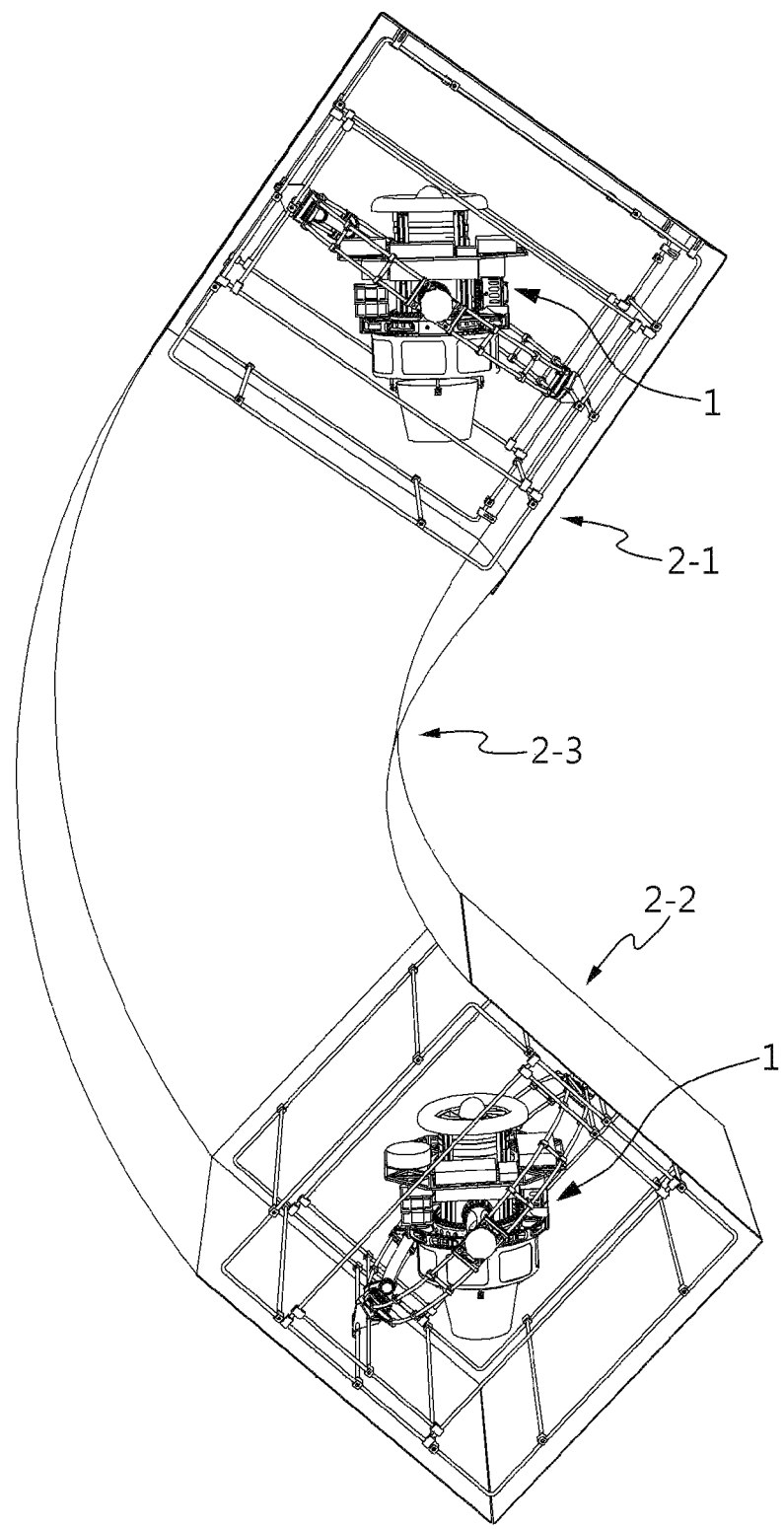
Figure 15C:
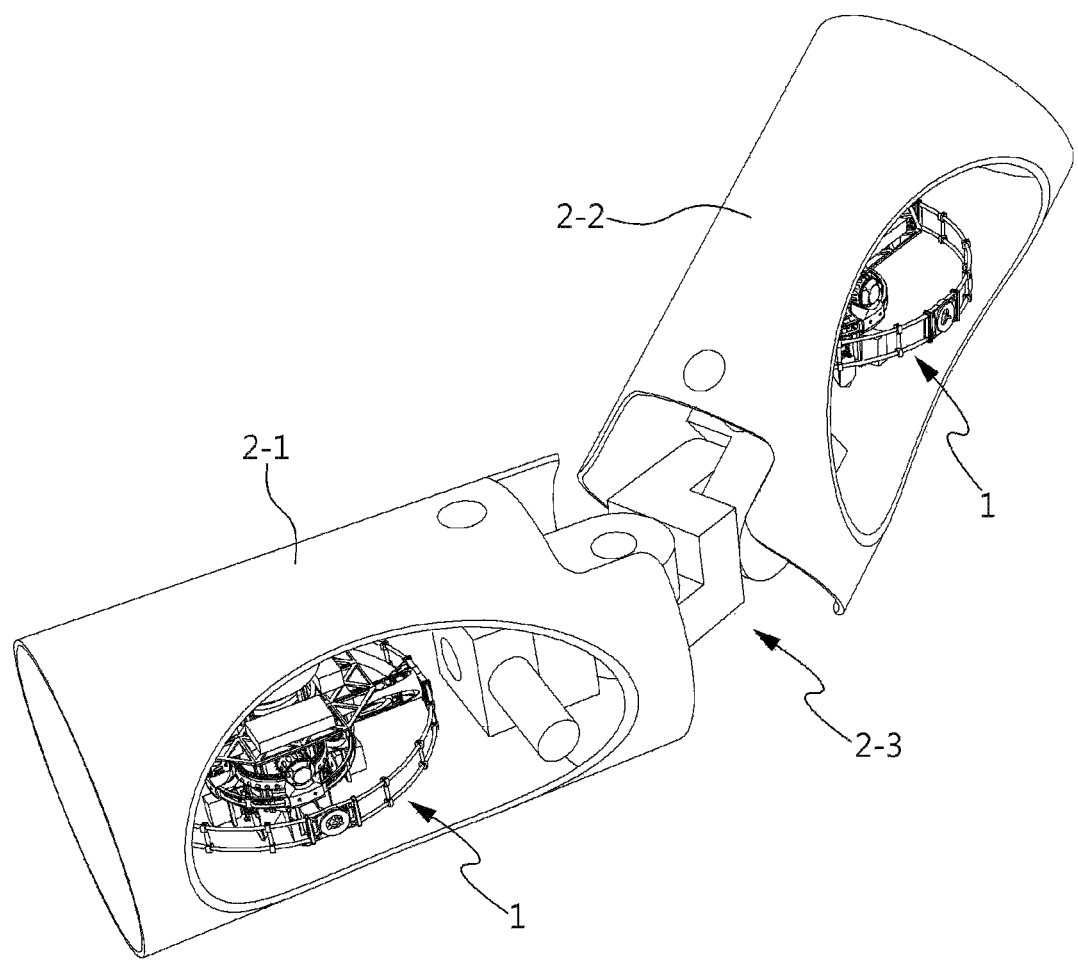

Referring to FIGS. 15A to 15C, a robot part 2 may include a first part 2-1 and a second part 2-2 in which the posture control device 1 according to the present invention is installed, and a third part 2-3 for connecting the first part 2-1 and the second part 2-2.

Each of the first part 2-1 and the second part 2-2 have an outer shell 61 formed of a material having a high gas permeability so as not to disturb generation of propulsive force of the thruster 100 and also includes a frame structure 62 in which the posture control device 1 is installed.

Here, the frame structure 62 that constitutes a frame of the robot part 2 may have one of various shapes according to the shape of the applied robot part 2. The outer shell 61 may be omitted as required. Contrary to this, when the outer shell 61 has certain rigidity and functions as a frame, the frame structure 62 may also be omitted.

The outer shell 61 may have a shape with a through hole through which air passes or a shape of a mesh, such as an iron net, but the present invention is not limited thereto. However, when a gap between the thruster 100 and the outer shell 61 is sufficient so as not to disturb generation of propulsive force, the outer shell 61 may also be made of a material having low gas permeability or no gas permeability. Also, considering the generated direction of the propulsive force due to change of direction of the thruster 100, the part of the outer shell 61 where is affected by the propulsive force and the part of the outer shell 61 where is not affected by the propulsive force may have different gas permeability from each other.

The third part 2-3 may be formed of a bendable or extendable material so that the posture of the robot part 2 may be changed due to relative motion of the first part 2-1 and the second part 2-2 or (see FIGS. 15A and 15B, in this case, preferably, a material having high gas permeability, like in the outer shell of the first part and the second part) may be formed of joints or articular shapes (see FIG. 15C). For example, the third part 2-3 may be formed of joints having a shape applied to the "Slave" robot of Carl Pisaturo, and in this case, the degree of freedom of a layout of a motor is increased and thus, this may be more advantageous in designing the center of gravity of the robot to which the posture control device 1 using the propulsive force according to the present invention is applied.

Figure 16A:
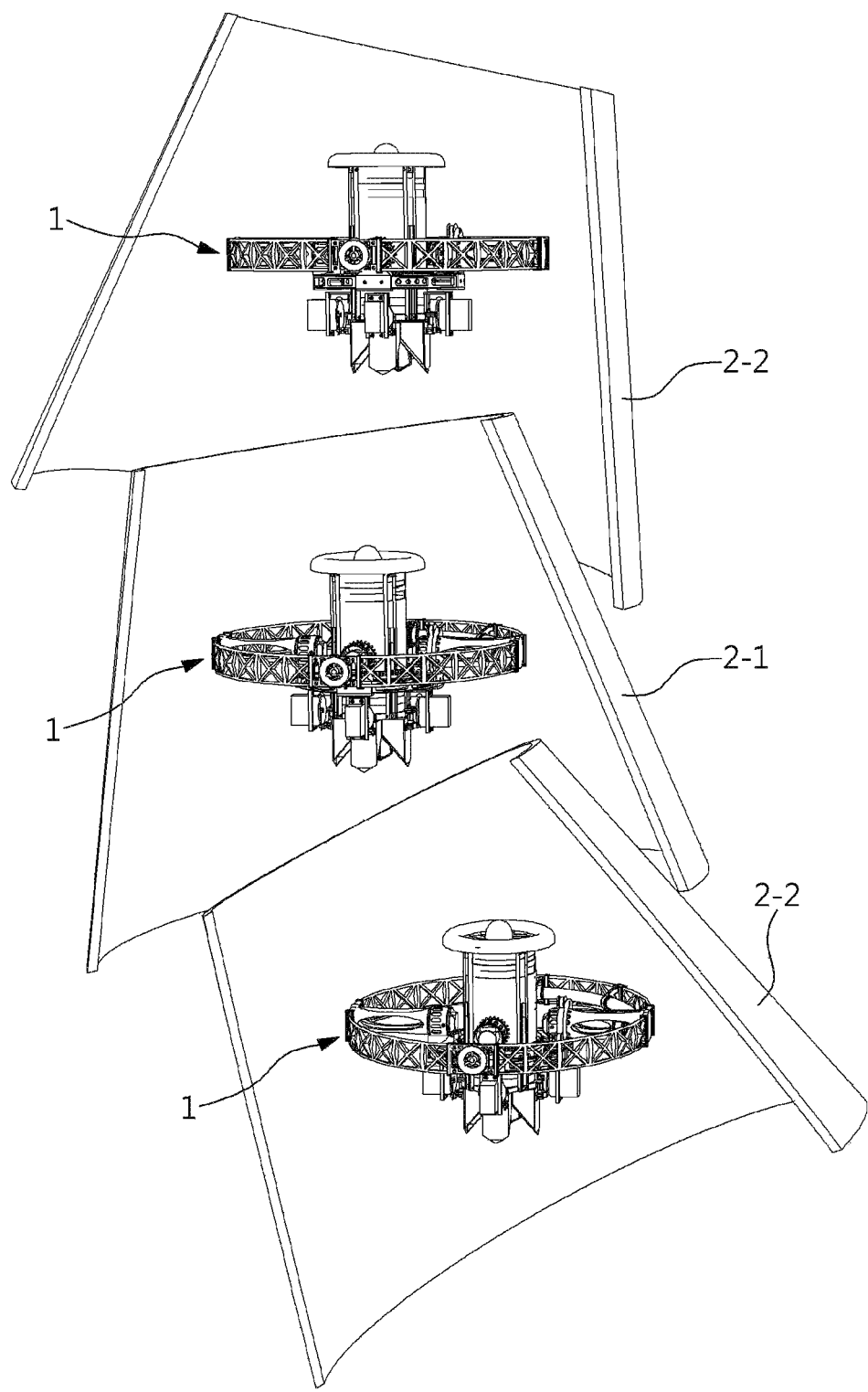
Figure 16B:
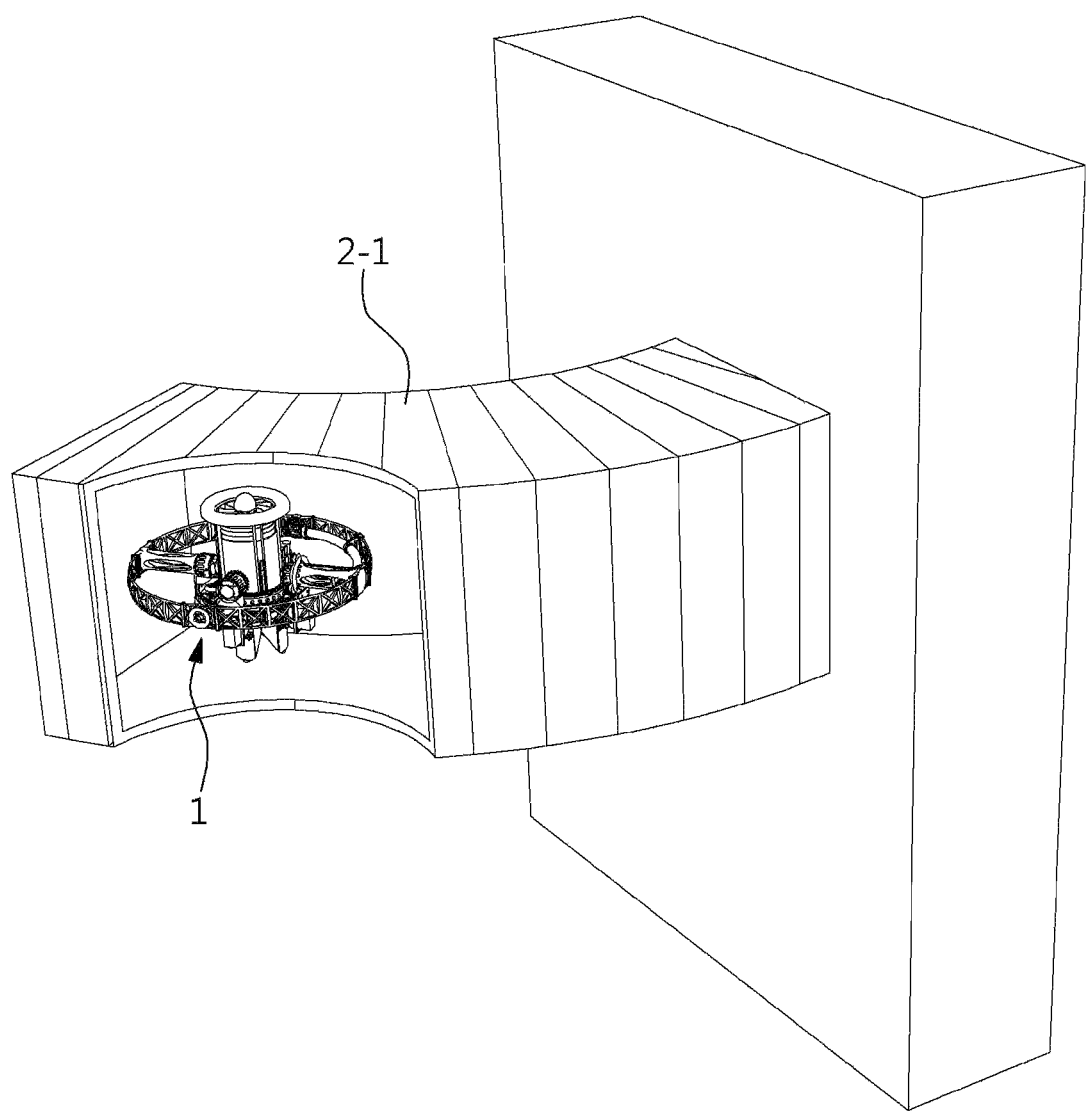

Meanwhile, as shown in FIGS. 16A and 16B, the robot part 2 may have a shape in which the second part 2-2 and/or the third part 2-3 is omitted.

Referring to FIG. 16A, the robot part 2 having a shape in which the third part 2-3 is omitted includes only the first part 2-1 and the second part 2-2 in which the posture control device 1 is installed and is configured so that the posture of the robot part 2 may be changed due to relative motion of the first part 2-1 and the second part 2-2 by the posture control device 1.

Also, referring to FIG. 16B, the robot part 2 having a shape in which the second part 2-2 and the third part 2-3 are omitted includes only the first part 2-1 in which the posture control device 1 is installed. The first body 2-1 includes a bendable or extendable material or structure (joints or articular shapes) so that the posture of the robot part 2 may be changed due to a change in shape of the first part 2-1 by the posture control device 1.

Also, although not shown in the drawings, the robot part 2 having a shape in which the second part 2-2 is omitted includes the third part 2-3 in which the posture control device 1 is not installed and the first part 2-1 in which the posture control device 1 is installed, and thus, the posture of the robot part 2 may be changed due to relative motion of the first part 2-1 with respect to the third part 2-3. In this case, the third part 2-3 may be arranged with the first part 2-1 and link therewith as shown in FIG. 16A and thus does not need to be formed of a bendable or extendable material or structure.

Meanwhile, the number of the posture control device 1 provided at the first part 2-1 or the second part 2-2 may be properly changed according to propulsive force performance of the thruster 100 and motion implementation purpose, and one of the first part 2-1 and the second part 2-2 may include another type of a posture control device that is not the posture control device 1 according to the present invention or may not include any posture control device.

Figure 17:
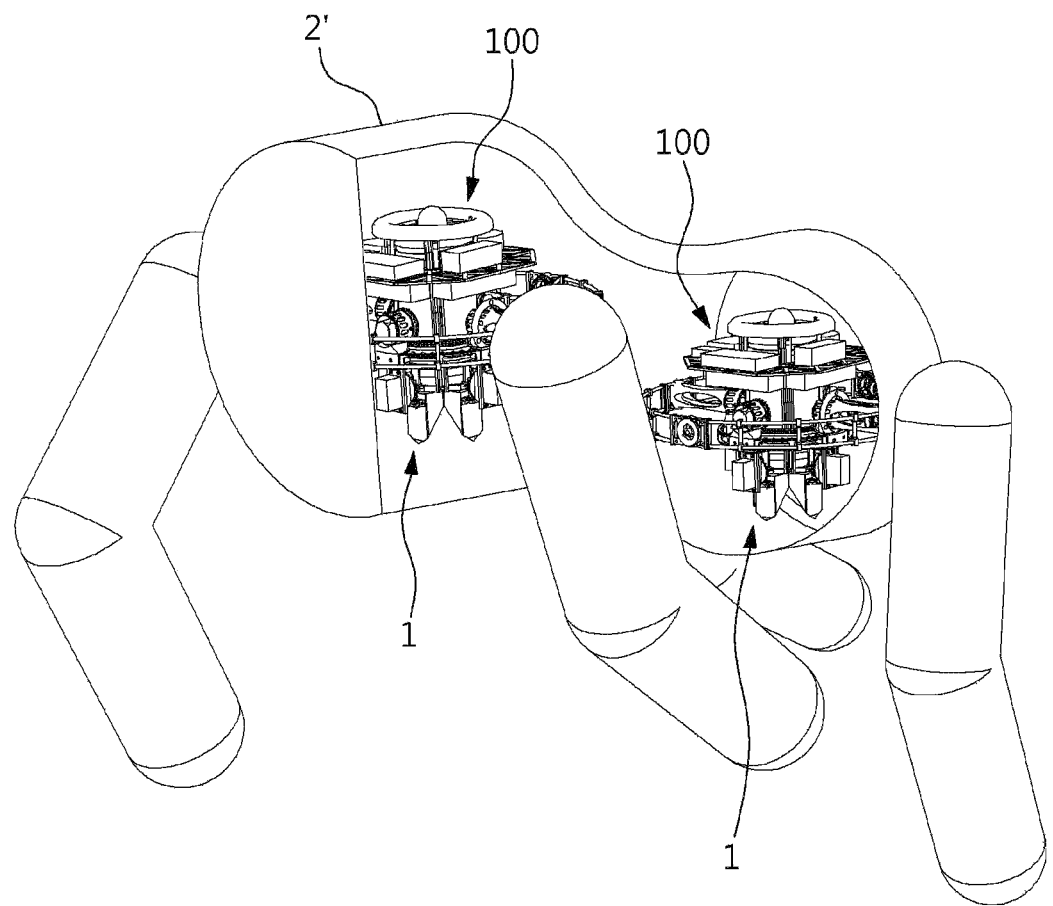
Figure 18:
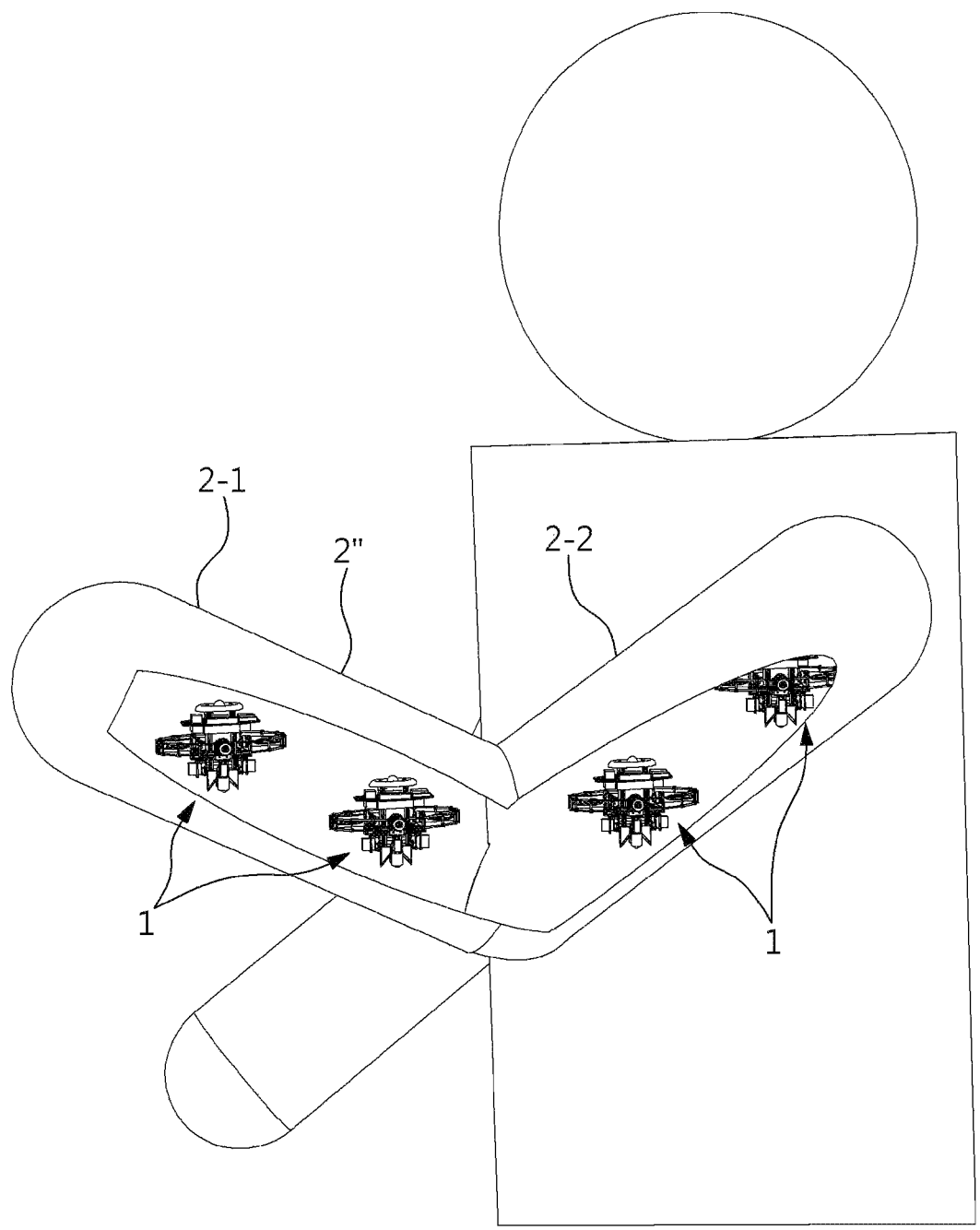
Figure 19:
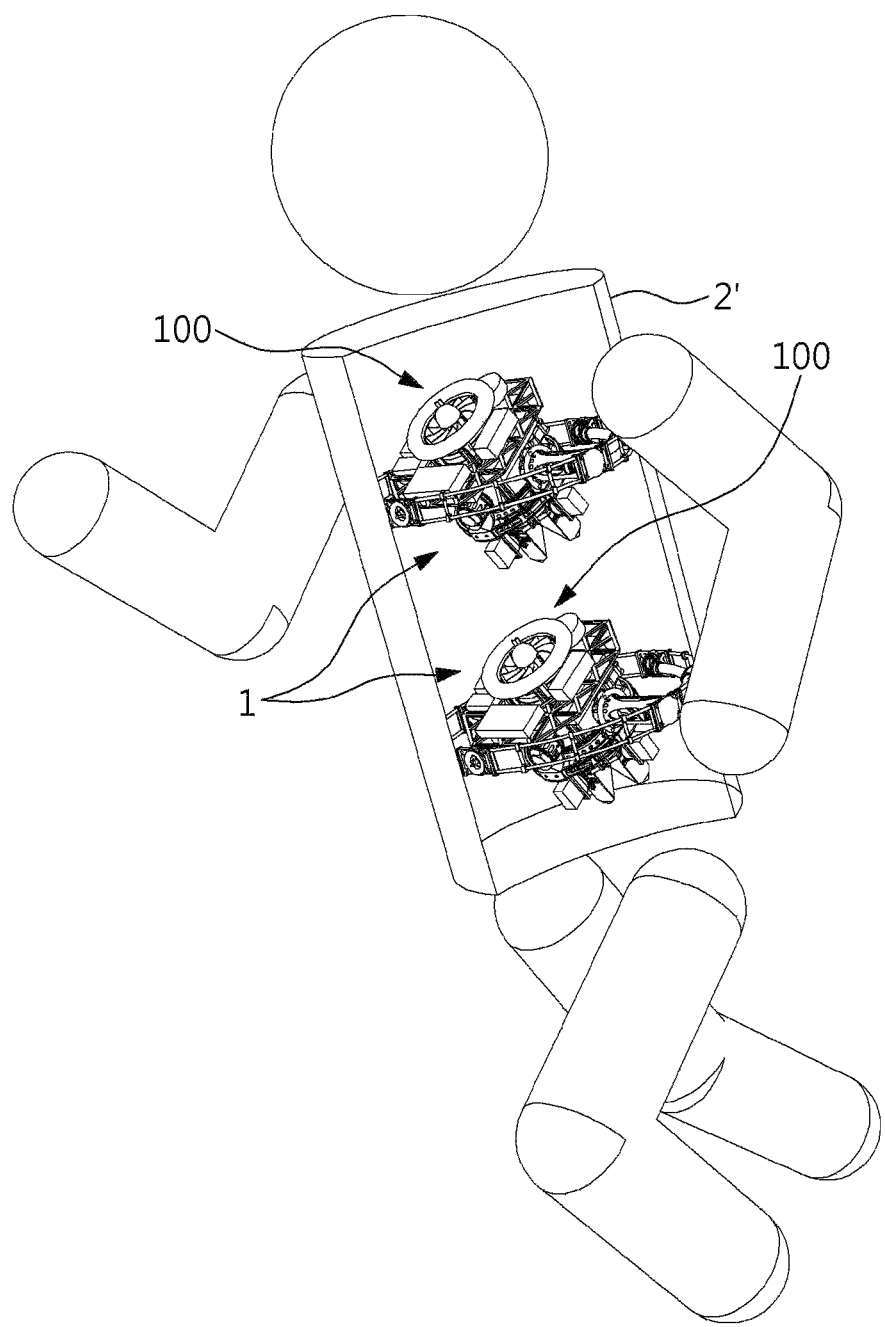

As shown in FIGS. 17 to 19, the robot part 2 having the above configuration may be a body 2', an arm 2" or a leg 2" of the robot.

Referring to FIGS. 17 and 18, the thruster 100 hovers in flight by itself by supporting a load of the robot part 2, and the robot part 2 is rotated with respect to the thruster 100 hovering in flight using the rotation mechanism 200 and thus inclination or position of the robot part 2 may be changed.

Also, as shown in FIG. 19, when the robot moves, the thruster 100 is rotated with respect to the body 2' of the robot so that a direction of propulsive force generated by the thruster 100 is changed and a driving force required for movement of the robot may be assisted or increased. In this case, for smooth rotation of the thruster 100 by the rotation mechanism 200, propulsive force of the thruster 100 during rotation may be reduced or may not be generated.

In the posture control device for a robot according to the present invention and the robot including the same described above, a load of a robot part is supported by propulsive force of a thruster so that limitations caused by the weight can be reduced, wide selection of components that constitute the robot is possible, the number of the components can be reduced, and relatively inexpensive components can be used, and thus the cost of manufacturing the robot can be reduced and variety can be secured in constructing and designing the appearance of the robot.

In addition, even in a usage environment in which a bearing power is weak and movement is not easy, such as in sand, and thus the load of the robot is hauled by generation of propulsive force so that movements are easily possible.

Furthermore, since stable posture control of the robot part can be easily guided through propulsive force of the thruster, agility and mobility of the robot is increased, a wider radius of action is possible, and the robot capable of performing various motions can be manufactured. As described above, the posture control device for a robot and the robot having the same according to the present invention have been described with reference to the attached drawings in detail. However, the embodiments in the present specification and the attached drawings are just used for a purpose of explaining a technical spirit of the present invention but are not used to limit the scope of the present invention in the claims. Thus, it will be understood by those skilled in the art that various modifications and equivalent embodiments are possible.

The invention claimed is:

1. A posture control device for a robot comprising:
a thruster configured to generate a propulsive force for supporting or hauling a load of a robot part; and
a rotation mechanism installed between the robot part and the thruster so as to enable the robot part to rotate with respect to the thruster, or the thruster to rotate with respect to the robot part,
wherein the rotation mechanism comprises rotation driving units that rotate the robot part or the thruster about at least two axes of rotation that form a right angle with respect to each other,
the rotation driving units comprises a first rotation driving unit having a first axis of rotation that forms a right angle with respect to an axis of the thruster and a second rotation driving unit having a second axis of rotation that forms a right angle with respect to each of the axis of the thruster and the first axis of rotation,
the rotation mechanism comprises a thruster coupling unit coupled to the thruster and a frame coupled with the robot part to be rotatable about the first axis of rotation,
the thruster coupling unit and the frame are coupled to each other to be rotatable about the second axis of rotation by the second rotation driving unit, and
the first rotation driving unit comprises a motor that is installed to be rotatable about the second axis of rotation and generates a rotational force, a driving unit body being rotated with respect to the thruster coupling unit together with the motor and the frame when the frame or the thruster coupling unit is rotated about the second axis of rotation, and a power transmission mechanism that transmits the rotational force of the motor to a rotation element, which is fixed to the robot part on the first axis of rotation, so that the robot part is rotated with respect to the frame or the frame is rotated with respect to the robot part about the first axis of rotation.

2. The posture control device of claim 1, wherein the second rotation driving unit comprises:
a motor that is fixedly installed on the thruster coupling unit and generates a rotational force; and
a driving unit body having one end fixed and coupled to the frame and the other end coupled to a rotating shaft of the motor so that the frame is rotated with respect to the thruster coupling unit or the thruster coupling unit is rotated with respect to the frame about the second axis of rotation.

3. The posture control device of claim 1, wherein the rotation element comprises a second pinion gear fixed and coupled to the robot part, and the power transmission mechanism comprises a first pinion gear coupled to a rotating shaft of the motor and a rotating shaft having gears at both ends of the rotating shaft to be engaged with the first pinion gear and the second pinion gear and configured to transmit rotation power of the first pinion gear to the second pinion gear.

4. The posture control device of claim 1, wherein the rotation element comprises:
a second pulley fixed and coupled to the robot part; and
the power transmission mechanism comprises a first pulley coupled to a rotating shaft of the motor and a belt for transmitting rotation power of the first pulley to the second pulley.

5. The posture control device of claim 4, wherein the belt has a shape that follows a shape of the frame using tension pulleys installed along the frame.

6. A robot comprising parts having the posture control device according to claim 1 provided thereto.

7. A robot comprising a first part and a second part having the posture control device according to claim 1 provided thereto, wherein the first part and the second part are connected to each other so as to realize a relative motion with respect to each other.

8. A posture control device for a robot comprising:
a thruster configured to generate a propulsive force for supporting or hauling a load of a robot part; and
a rotation mechanism installed between the robot part and the thruster so as to enable the robot part to rotate with respect to the thruster, or the thruster to rotate with respect to the robot part,
wherein the rotation mechanism comprises rotation driving units that rotate the robot part or the thruster about at least two axes of rotation that form a right angle with respect to each other,
the rotation driving units comprises a first rotation driving unit having a first axis of rotation that forms a right angle with respect to an axis of the thruster, a second rotation driving unit having a second axis of rotation that forms a right angle with respect to each of the axis of the thruster and the first axis of rotation, and a third rotation driving unit having a third axis of rotation parallel to the axis of the thruster and configured to be independent of generating the propulsive force of the thruster,
the rotation mechanism comprises a thruster coupling unit coupled to the thruster and a frame coupled with the robot part to be rotatable about the first axis of rotation,
the thruster coupling unit and the frame are coupled to each other to be rotatable about the second axis of rotation by the second rotation driving unit, and
the thruster coupling unit comprises a fixing part fixed and coupled to the thruster and a rotation part located outside the fixing part and coupled to the fixing part to be rotatable about the third axis of rotation.

9. The posture control device of claim 8, wherein the third axis of rotation comprises the same axis as the axis of the thruster.

10. The posture control device of claim 8, wherein:
a rail is formed on an outer surface of the fixing part; and
a roller that is moved by rolling along the rail of the fixing part is provided on an inner surface of the rotation part.

11. The posture control device of claim 8, wherein the third rotation driving unit comprises:
a motor that is fixedly installed on the rotation part and generates a rotational force;
a pinion gear fixedly installed on the rotating shaft of the motor; and
a ring gear formed on the fixing part and engaged with the pinion gear so that the rotation part is rotated with respect to the fixing part or the fixing part is rotated with respect to the rotation part about the third axis of rotation by the rotational force of the motor.

12. The posture control device of claim 11, wherein the third rotation driving unit is provided at a location which faces the second rotation driving unit with respect to the thruster coupling unit, and
wherein the motor is fixedly installed on the rotation part, and the rotation part is connected to the frame using a connection body having one end fixed and coupled to the frame and the other end coupled to the rotation part to be rotatable about the second axis of rotation.

13. The posture control device of claim 8, wherein the first rotation driving unit comprises a motor for generating a rotational force configured that a main body of the motor is fixedly installed on the frame and a rotating shaft of the motor is fixedly installed on the robot part so that the robot part is rotated with respect to the frame or the frame is rotated with respect to the robot part about the first axis of rotation by the rotational force of the motor.

14. The posture control device of claim 8, wherein the first rotation driving unit comprises a motor having a main body fixedly installed on the robot part and a rotating shaft fixedly installed on the frame and generates a rotational force so that the robot part is rotated with respect to the frame or the frame is rotated with respect to the robot part about the first axis of rotation by the rotational force of the motor.

15. A robot comprising parts having the posture control device according to claim 8 provided thereto.

16. A robot comprising a first part and a second part having the posture control device according to claim 8 provided thereto, wherein the first part and the second part are connected to each other so as to realize a relative motion with respect to each other.

* * * * *